US006272133B1

(12) United States Patent
Bialkowski et al.

(10) Patent No.: US 6,272,133 B1
(45) Date of Patent: Aug. 7, 2001

(54) PACKET FILTERING METHOD

(75) Inventors: Jan Bialkowski; Gururaj Singh, both of San Jose, CA (US)

(73) Assignee: Inviscid Networks, Inc., San Jose, CA (US)

( * ) Notice: Subject to any disclaimer, the term of this patent is extended or adjusted under 35 U.S.C. 154(b) by 0 days.

(21) Appl. No.: 09/315,769

(22) Filed: May 20, 1999

Related U.S. Application Data

(60) Provisional application No. 60/086,291, filed on May 21, 1998.

(51) Int. Cl.[7] .................................................. H04L 12/28
(52) U.S. Cl. ................................................................ 370/389
(58) Field of Search ..................................... 370/389, 392, 370/475, 397, 474, 351, 401, 85.13, 254, 403, 402; 707/206, 509, 1, 501; 702/19, 20, 31; 379/101.01, 88.2, 88.24; 455/186.1

(56) References Cited

U.S. PATENT DOCUMENTS

| | | | | |
|---|---|---|---|---|
| 4,989,134 | * | 1/1991 | Shaw ..................................... | 707/206 |
| 5,610,905 | * | 3/1997 | Murthy et al. ........................ | 370/401 |
| 5,805,808 | * | 9/1998 | Hasani et al. ......................... | 370/392 |
| 5,918,052 | * | 6/1999 | Kruskal et al. ........................... | 717/1 |
| 5,951,651 | * | 9/1999 | Lakshman et al. ................... | 370/351 |

* cited by examiner

*Primary Examiner*—Wellington Chin
*Assistant Examiner*—Prenell Jones
(74) *Attorney, Agent, or Firm*—Ansel M. Schwartz

(57) ABSTRACT

A method of filtering packets having a class. The method includes the steps of accessing a table comprised of entries that include an indication to which class a given entry applies. Then there is the step of searching the entries until an entry whose class indication corresponds to a current class of the packet. Next there is the step of forwarding a frame associated with the entry whose class indication corresponds to the class of the packet. A data communication apparatus. The apparatus includes a mechanism for routing or switching packets. The apparatus includes a memory having information for routing or switching the packets. The apparatus includes a mechanism for compaction of information in the memory which removes redundancies in the information.

14 Claims, 7 Drawing Sheets

| | | CLASS | | | |
|---|---|---|---|---|---|
| | | L1 | L2 | L3 | L4 |
| PATTERN | A | $TAG_0$ DROP | $TAG_1$ TO L1 | $TAG_1$ TO L1 | $TAG_1$ TO L1 |
| | B | $TAG_0$ DROP | $TAG_1$ TO L1 | $TAG_1$ TO L1 | $TAG_1$ TO L1 |
| | C | $TAG_2$ TO L2 | $TAG_0$ DROP | $TAG_2$ TO L2 | $TAG_2$ TO L2 |
| | D | $TAG_2$ TO L2 | $TAG_0$ DROP | $TAG_2$ TO L2 | $TAG_2$ TO L2 |
| | E | $TAG_3$ TO L3 | $TAG_3$ TO L3 | $TAG_0$ DROP | $TAG_3$ TO L3 |
| | F | $TAG_3$ TO L3 | $TAG_3$ TO L3 | $TAG_0$ DROP | $TAG_3$ TO L3 |
| | G | $TAG_4$ TO L4 | $TAG_4$ TO L4 | $TAG_4$ TO L4 | $TAG_0$ DROP |
| | H | $TAG_4$ TO L4 | $TAG_4$ TO L4 | $TAG_4$ TO L4 | $TAG_0$ DROP |

| PATTERN | L1 | L2 | L3 | L4 | CLASS L1+LRN | L2+LRN | L3+LRN | L4+LRN |
|---|---|---|---|---|---|---|---|---|
| ? | T5 L2+3+4 | T6 L1+3+4 | T7 L1+2+4 | T8 L1+2+3 | T15 L2+3+4+lm1 | T25 L1+3+4+lm2 | T30 L1+2+4+lm3 | T40 L1+2+3+lm4 |
| A | T0 DROP | T1 TO L1 | T1 TO L1 | T1 TO L1 | T10 lm1 ONLY | T21 TO L1+lm2 | T31 TO L1+lm3 | T41 TO L1+lm4 |
| B | T0 DROP | T1 TO L1 | T1 TO L1 | T1 TO L1 | T10 lm1 ONLY | T21 TO L1+lm2 | T31 TO L1+lm3 | T41 TO L1+lm4 |
| C | T2 TO L2 | T0 DROP | T2 TO L2 | T2 TO L2 | T12 TO L2+lm1 | T20 lm2 ONLY | T32 TO L2+lm3 | T42 TO L2+lm4 |
| D | T2 TO L2 | T0 DROP | T2 TO L2 | T2 TO L2 | T12 TO L2+lm1 | T20 lm2 ONLY | T32 TO L2+lm3 | T42 TO L2+lm4 |
| E | T3 TO L3 | T3 TO L3 | T0 DROP | T3 TO L3 | T13 TO L3+lm1 | T23 TO L3+lm2 | T30 lm3 ONLY | T43 TO L3+lm4 |
| F | T3 TO L3 | T3 TO L3 | T0 DROP | T3 TO L3 | T13 TO L3+lm1 | T23 TO L3+lm2 | T30 lm3 ONLY | T43 TO L3+lm4 |
| G | T4 TO L4 | T4 TO L4 | T4 TO L4 | T0 DROP | T14 TO L4+lm1 | T24 TO L4+lm2 | T34 TO L4+lm3 | T40 lm4 ONLY |
| H | T4 TO L4 | T4 TO L4 | T4 TO L4 | T0 DROP | T14 TO L4+lm1 | T24 TO L4+lm2 | T34 TO L4+lm3 | T40 lm4 ONLY |

FIG. 5

| CLASS | | | | | | | | TAG | |
|---|---|---|---|---|---|---|---|---|---|
| L1 | L2 | L3 | L4 | L1+lm | L2+lm | L3+lm | L4+lm | | |
| 1 | 0 | 0 | 0 | 0 | 0 | 0 | 0 | $T_5$ | L2+3+4 |
| 0 | 1 | 0 | 0 | 0 | 0 | 0 | 0 | $T_6$ | L1+3+4 |
| 0 | 0 | 1 | 0 | 0 | 0 | 0 | 0 | $T_7$ | L1+2+4 |
| 0 | 0 | 0 | 1 | 0 | 0 | 0 | 0 | $T_8$ | L1+2+3 |
| 0 | 0 | 0 | 0 | 1 | 0 | 0 | 0 | $T_{15}$ | L2+3+4+lm1 |
| 0 | 0 | 0 | 0 | 0 | 1 | 0 | 0 | $T_{20}$ | L1+3+4+lm2 |
| 0 | 0 | 0 | 0 | 0 | 0 | 1 | 0 | $T_{30}$ | L1+2+4+lm3 |
| 0 | 0 | 0 | 0 | 0 | 0 | 0 | 1 | $T_{40}$ | L1+2+3+lm4 |
| 0 | 1 | 1 | 1 | 0 | 0 | 0 | 0 | $T_1$ | to L1 |
| 1 | 0 | 0 | 0 | 0 | 0 | 0 | 0 | $T_0$ | DROP |
| 0 | 0 | 0 | 0 | 1 | 0 | 0 | 0 | $T_{10}$ | lm1 ONLY |
| 0 | 0 | 0 | 0 | 0 | 1 | 0 | 0 | $T_{21}$ | to L1+lm2 |
| 0 | 0 | 0 | 0 | 0 | 0 | 1 | 0 | $T_{31}$ | to L1+lm3 |
| 0 | 0 | 0 | 0 | 0 | 0 | 0 | 1 | $T_{41}$ | to L1+lm4 |
| 1 | 0 | 1 | 1 | 0 | 0 | 0 | 0 | $T_2$ | to L2 |
| 0 | 1 | 0 | 0 | 0 | 0 | 0 | 0 | $T_0$ | DROP |
| 0 | 0 | 0 | 0 | 1 | 0 | 0 | 0 | $T_{12}$ | to L2+lm1 |
| 0 | 0 | 0 | 0 | 0 | 1 | 0 | 0 | $T_{20}$ | lm2 ONLY |
| 0 | 0 | 0 | 0 | 0 | 0 | 1 | 0 | $T_{32}$ | to L2+lm3 |
| 0 | 0 | 0 | 0 | 0 | 0 | 0 | 1 | $T_{42}$ | to L2+lm4 |
| 1 | 1 | 0 | 1 | 0 | 0 | 0 | 0 | $T_3$ | to L3 |
| 0 | 0 | 1 | 0 | 0 | 0 | 0 | 0 | $T_0$ | DROP |
| 0 | 0 | 0 | 0 | 1 | 0 | 1 | 0 | $T_{13}$ | to L3+lm1 |
| 0 | 0 | 0 | 0 | 0 | 1 | 0 | 0 | $T_{23}$ | to L3+lm2 |
| 0 | 0 | 0 | 0 | 0 | 0 | 1 | 0 | $T_{30}$ | lm3 ONLY |
| 0 | 0 | 0 | 0 | 0 | 0 | 0 | 1 | $T_{43}$ | to L3+lm4 |
| 1 | 1 | 1 | 0 | 0 | 0 | 0 | 0 | $T_4$ | to L4 |
| 0 | 0 | 0 | 1 | 0 | 0 | 0 | 0 | $T_0$ | DROP |
| 0 | 0 | 0 | 0 | 1 | 0 | 0 | 0 | $T_{14}$ | to L4+lm1 |
| 0 | 0 | 0 | 0 | 0 | 1 | 0 | 0 | $T_{24}$ | to L4+lm2 |
| 0 | 0 | 0 | 0 | 0 | 0 | 1 | 0 | $T_{34}$ | to L4+lm3 |
| 0 | 0 | 0 | 0 | 0 | 0 | 0 | 1 | $T_{40}$ | lm4 ONLY |

FIG.6

PACKET FILTERING METHOD

This application claims benefit of Provisional application Ser. No. 60/086,291 filed May 21, 1998.

FIELD OF THE INVENTION

The present invention is related to packet filtering. More specifically, the present invention is related to packet filtering utilizing a table comprised of entries wherein redundant entries have been removed.

BACKGROUND OF THE INVENTION

In packet filtering, information for filtering the packet is commonly stored in tables. This information is searched to effect the packet filtering. The more information that must be searched, the longer the filtering takes of the packet. The information in tables is often full of redundancies. If the redundancies could be removed, less memory would be necessary to store the information, and the speed of the search for the filtering would increase.

SUMMARY OF THE INVENTION

The present invention pertains to a method of filtering packets having a class. The method comprises the steps of accessing a table comprised of entries that include an indication to which class a given entry applies. Then there is the step of searching the entries until an entry whose class indication corresponds to a current class of the packet. Next there is the step of forwarding a frame associated with the entry whose class indication corresponds to the class of the packet.

The present invention pertains to a data communication apparatus. The apparatus comprises a mechanism for routing or switching packets. The apparatus comprises a memory having information for routing or switching the packets. The apparatus comprises a mechanism for compaction of information in the memory which removes redundancies in the information.

The present invention can be utilized with any data communication device where packet switching/routing is performed. This invention addresses memory space concerns. Traditional packet filtering utilizes software implementations that have limited performance. Hardware-based filtering solution may require either CAM memories (expensive and of limited size) or very large search spaces. Frequently combining several packet header fields leads to very rapid growth of the number of connections.

The invention allows combining several independent search steps that result in a single compound operation that allows implementation of packets filtering. Such packet filtering is frequently required for network traffic monitoring and management and often requires fine granularity of the switching/routing decision. In practical applications several separate fields of packet headers are required to fully specify the switching/routing decision.

The present invention provides many advantages, including: (1) ASIC-based all hardware implementation is possible; (2) small size of memory space allows cost effective implementation with standard parts; and (3) small number of memory accesses per processed field allows very high performance (millions of packets per second) with readily available standard components, to name but a few. Other advantages will be recognized by one of ordinary skill in this art upon review of the description below of the accompanying figures.

BRIEF DESCRIPTION OF THE DRAWINGS

In the accompanying drawings, the preferred embodiment of the invention and preferred methods of practicing the invention are illustrated in which:

FIG. 5 is a representation of a complete table.

FIG. 6 is a representation of a compacted table.

DETAILED DESCRIPTION

Figure 8:
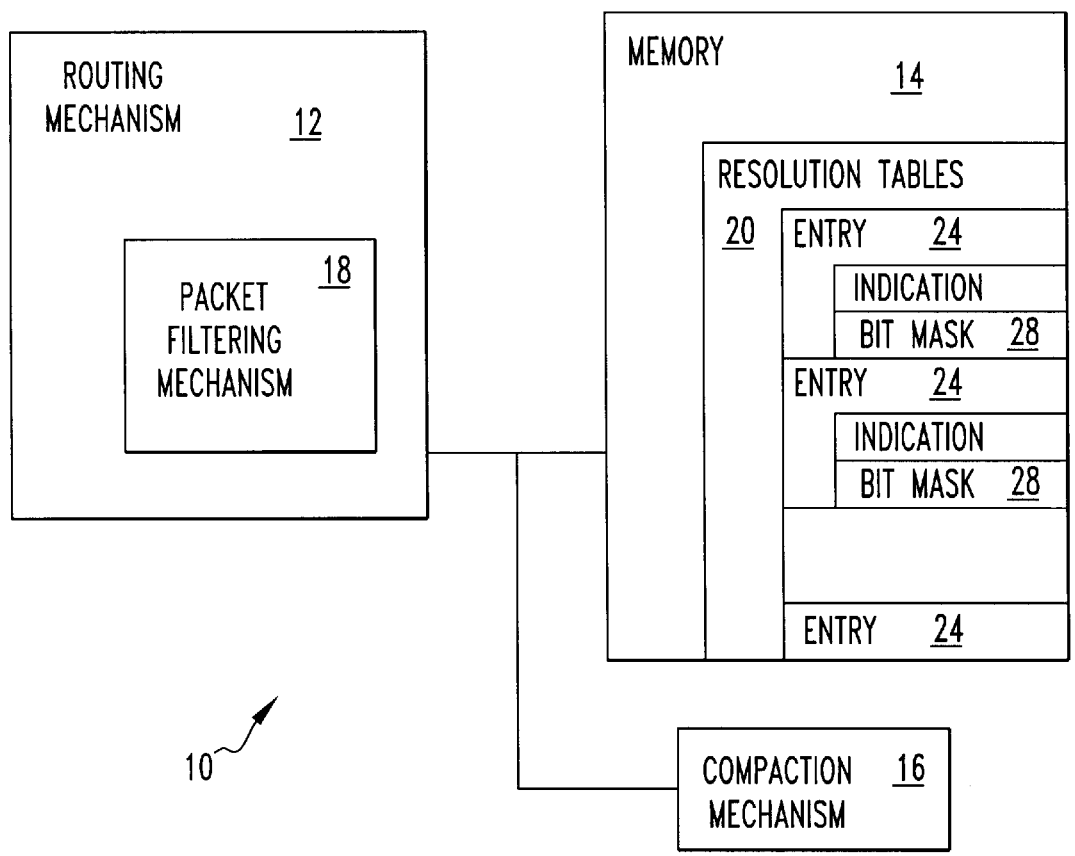
FIG. 8 is a schematic representation of an apparatus of the present invention.

Referring now to the drawings wherein like reference numerals refer to similar or identical parts throughout the several views, and more specifically to FIG. 8 thereof, there is shown a data communication apparatus 10. The apparatus 10 comprises a mechanism 12 for routing or switching packets. The apparatus 10 comprises a memory 14 having information for routing or switching the packets. The apparatus 10 comprises a mechanism for compaction of information in the memory 14 which removes redundancies in the information.

Preferably, the writing mechanism includes a packet filtering mechanism 18. The memory 14 preferably includes resolution tables 20, as shown in FIGS. 5 and 6. Preferably, the resolution tables 20 have rows 22 represented by lists of entries which has the information. The compaction mechanism 16 preferably removes any redundant entries in each row. Preferably, the compaction mechanism 16 removes any redundant rows 22 in the resolution tables 20.

The present invention pertains to a method of filtering packets having a class. The method comprises the steps of accessing a table comprised of entries that include an indication to which class a given entry 24 applies. Then there is the step of searching the entries until an entry 24 whose class indication corresponds to a current class of the packet. Next there is the step of forwarding a frame associated with the entry 24 whose class indication corresponds to the class of the packet.

Preferably, after the searching step, there is the step of reiterating the accessing and searching steps. The indication of each entry 24 preferably includes a bit mask 28, and the searching step includes the step of searching the bit mask 28 of each entry 24 until a set bit of a bit mask 28 is encountered in a position corresponding to the class of the packet.

Preferably, the searching step includes the step of searching the bit masks 28 linearly. Each entry 24 preferably also includes a tag 26, and the forwarding step includes the step of forwarding the frame using the tag 26 of the entry 24. Preferably, the table has rows 22 represented by lists of entries.

Before the accessing step, there is preferably the step of compacting the table by removing redundant entries. Preferably, the compacting step includes the step of removing any redundant entries in each row. The compacting step preferably includes the step of removing any redundant rows 22 in the table.

The present invention provides a high degree of search space compaction by representing unique combinations of various fields by chain of tables ("resolution tables"). At each step of the process one table is utilized to evaluate a single field impact on the final filter outcome in a specific context. The context is represented as a state variable and its new value is arrived at each step.

Figure 1:
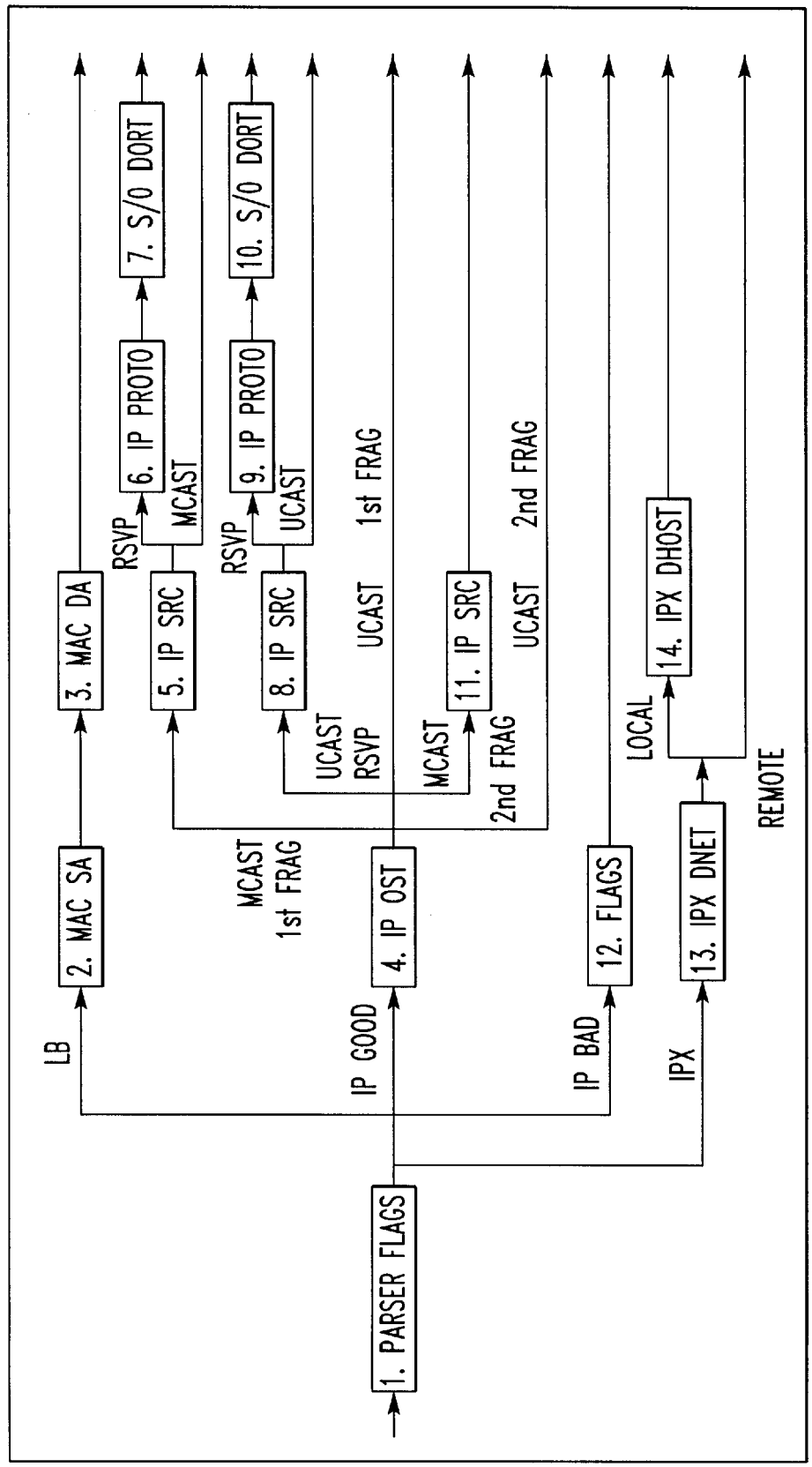
FIG. 1 is a representation of a set-wise chain of resolution steps.

A sample set-wise chain of the resolution steps is exemplified in FIG. 1. The goal of this design is to minimize such "combinatorial explosion" by identifying redundancies and impossibilities among the outcome combinations. A compacted indication of all previous steps is carried from step to step in a Resolver's state variable called a class. Each step of the resolution process selects a proper next step and the class applicable to it. Final outcome is the tag 26 block pointer and the final class both of which are saved in the frame descriptor when it is enqueued to the output queue.

At the conceptual level, each resolution step uses a two-dimensional array. Its rows 22 are selected by the corresponding key's values. Short keys can be used directly as an index; longer keys which tend to have sparsely populated space require data reduction performed by the search engine(s). The columns are selected by the current state of the Resolver's class. The entries in different columns of the same row have a great deal of redundancy. Similarly, there is considerable degree of repetition among rows 22.

Figures 2, 3:
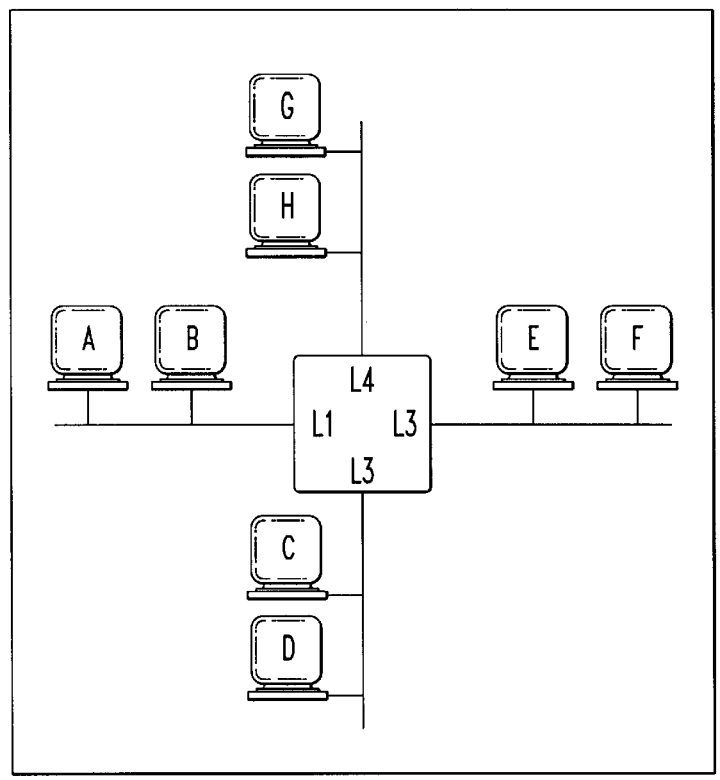
FIG. 2 is a schematic representation of a four-link bridge.
FIG. 3 is a representation of the table where each row contains three identical tags.

Such redundancies can be easily illustrated in a bridging application, as shown in FIG. 2. Imagine that there is a 4 link bridge (as shown in FIG. 2) that has stations A and B attached to link 1, C and D to link 2, E and F to link 3, and G and H to link 4. Let's ignore for time being the fact that there needs to be a provision for flooding unknown destinations and learning new MAC address.

The two-dimensional array of next steps would simply store tags 26 pointing to appropriate output links. Let's call those tags 26 T1, T2, T3 and T4, for tags 26 directing the frame to output ports 1, 2, 3, and 4, respectively, and TO for the tag 26 indicating that the frame should be discarded. The row index would be arrived at by the search of the destination MAC address. Suppose, that the numerical values are 0 for A, I for B, and so on through 7 for H. Columns of the table would be selected by the class variable that would simply encode the source links: 0 for link 1,1 for link 2, 2 for link 3, and 3 for link 4. The class is set appropriately for each arriving frame. The table would appear similar to the one shown in FIG. 3.

In FIG. 3, each row contains three identical tags 26. For a larger bridge with more links the table would have more columns with more repetitions. Much more compact data representation is possible in such a case if some searching is allowed. Each row can be represented by a list of entries that include an indication to which class a given entry 24 apply and, naturally, the tag 26. The class membership can be represented by a bit mask 28. It has one bit per class value which is set if the entry 24 is valid in a corresponding class case. The table access begins at the first entry 24 of the list. The bit masks 28 are then searched linearly until a set bit is encountered in a position corresponding to the current class value. When found that entry's 24 tag 26 is used for frame forwarding.

Figure 4:
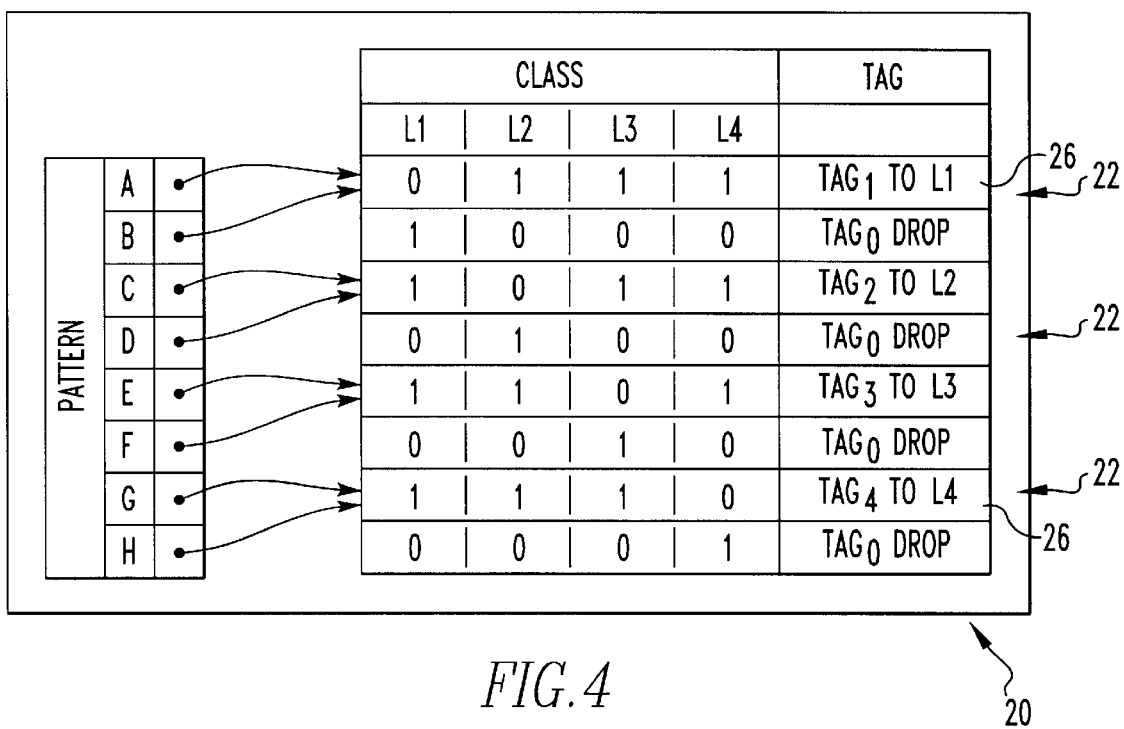
FIG. 4 is a representation of a four-port bridge's pattern and resolution table.

Each table row in the above example now has only two entries in the search list since each row contains only two different tags 26. The space saving would approach 50% relative to the original representation. It would be exactly 50% if not for the need to store the mask. Practical table configurations would have larger, variable number of list entries per row. The space saving can then easily exceed 90%. A four-port bridge's pattern and resolution table would appear similar to that shown in FIG. 4.

A practical table would also eliminate essentially identical rows 22 by introducing one level of indirection. A single column table is indexed by the pattern values and contains indices into the table containing the tags 26. The two tables would look like the one below. Thus, we have arrived at the representation of a typical Resolver step by two arrays: (1) a pattern table indexed by the search result entries of which contains a key value (pattern) and an index to the second table; and (2) a resolution table represents a resolution outcome, entries of which contain the class mask and the corresponding result.

This highly simplified example of a Bridge does not fully reflect the problem's complexity. A practical Bridge must have provisions to flood frames destined to unknown stations. It must also select frames for learning new MAC addresses. The learning process is based on the source MAC address rather than the destination MAC address used in the above example. The search of the source MAC address yields only 1 bit of information: the MAC is known or unknown. Note that a MAC address that is known but was learned on another port is equivalent to an unknown address since it requires the same learning process. This extra bit of information about the source MAC address must be carried to the subsequent step because it really affects the selection of the tag 26. The class variable is now modified to include that bit so there are 8 possible classes. Previously used classes L1, L2, L3, and L4 are used when the source address search indicates a known source and no learning is needed. New classes L1+LRN, L2+LRN, L2+LRN, and L4+LRN indicate the frame source link and also a need for learning of an unknown source address.

The above example also misses a flooding function. It requires a set of tags 26, one per port, to signify "food away from link N" which really includes all ports except the input port. The flood tags 26 are used when the destination MAC address search fails, that is when the destination is unknown. They are also used to forward multicast and broadcast frames. A complete table is shown in FIG. 5.

The compacted pattern and resolution tables 20 are presented in FIG. 6. Noteworthy is fact that the number of entries in the search list varies from row to row.

Actual implementation allows farther compaction of the learn entries that have really the same destination (the SCP) and only require source link data. A fully detailed resolution tables 20 are presented in later sections. Certain Resolver steps that process narrow keys (such as IP protocol field which is only 8-bit wide) omit the pattern table entirely. In such cases, the key value itself becomes the resolution table index.

Each resolution step begins with an entry 24 in a top level control table, called the Anchor table. The table has total of 32 entries of 42 bits and is stored in an internal RAM block on the die. The selected entry 24 specifies location of the key the search result in the Key store, their formats, base address of the pattern and resolution tables 20 and their entry 24 format and all other control information. The resolution process for any frame always begins with the $0^{th}$ entry 24 of the Anchor table.

Figure 7:
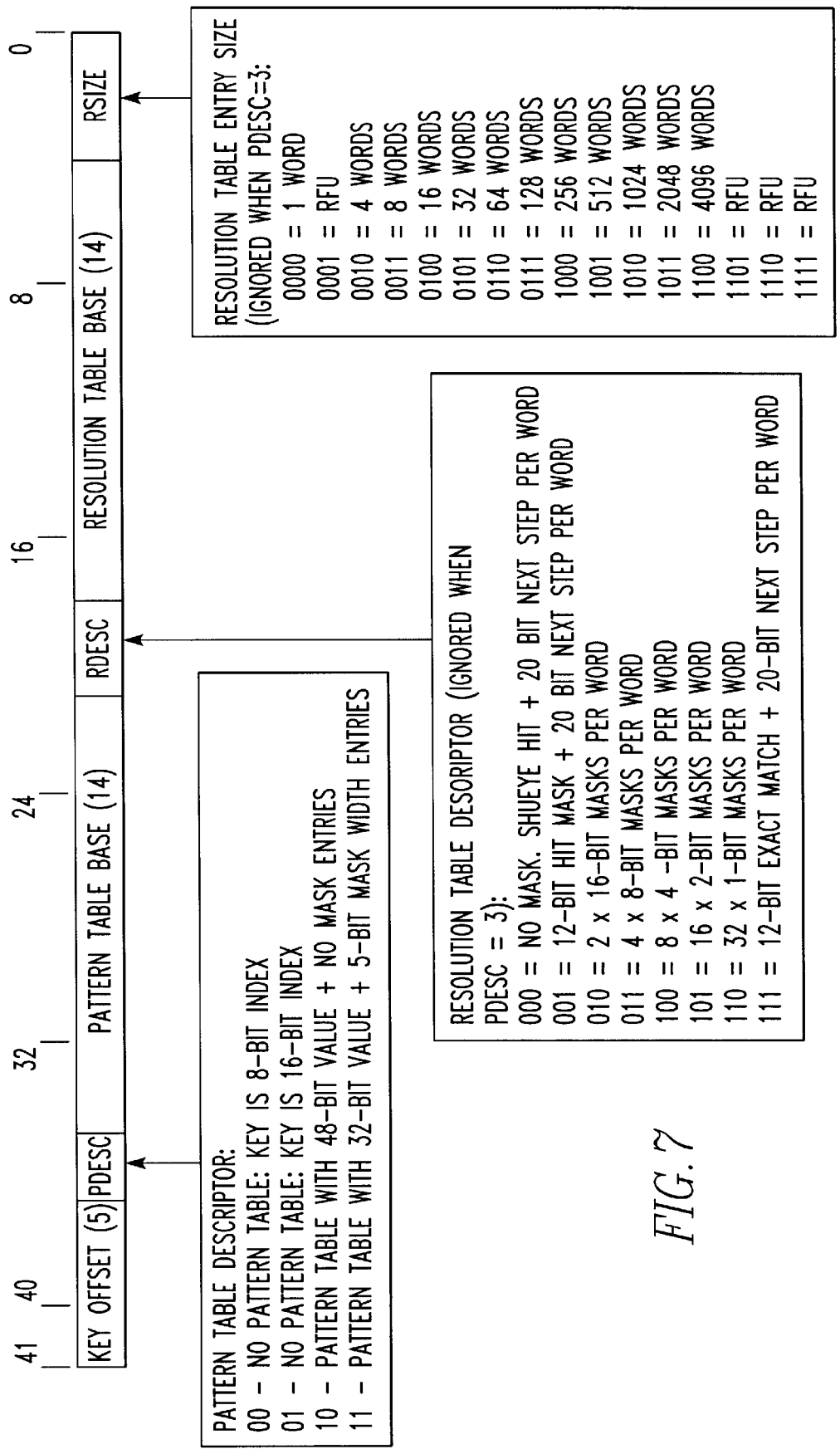
FIG. 7 is a representation of an entry format.

The entry 24 format is fixed and presented on FIG. 7. The fields are:

I. Key offset [5 bits] specifies word offset into the Key store where the key is stored. There are 2 possible interpretations of the Key store entry 24:

1. Searched key begins with 1-word search result. Subsequent 1, 2 or more words carry the key value, 2 bytes per word. It implies that there is a pattern table on which the key value matching needs to be carried out.
2. Short, non-searched key are stored in a single word (left adjusted) that is pointed to by the key offset field. In this case, there is no pattern table and the key value is used as a resolution table index.

II. Pdesc [2 bits] specifies whether the pattern table is present (and thus defines which of the above two interpretations apply) and if so, the format of the pattern table entry 24. The four possible values are:
   A. there is no pattern table and the key value is only 8 bit wide within the Key store word. It is always left-adjusted thus requiring logical right shift for indexing purposes. Such inconvenience at this stage greatly simplifies the frame header parser which need not perform any special actions for 1-byte fields. The Pattern Table Base field is ignored in this case.
   B. there is no pattern table and the 16-bit key value in the key store is used as an index. No shifting applies. The Pattern Table Base field is also ignored.
   C. pattern table is present and contains non-masked 48-bit pattern entries. Its base is given in the Pattern Table Base field.
   D. pattern table contains 32-bit masked entries. Its base is given in the Pattern Table Base field.

III. Pattern Table Base [14 bit] specifies physical location in the external CTRL memory 14 of the entry 24 with index of zero. For addressing purposes the base is scaled by 256 Words (1 KBytes) in order to cover entire 4 Mwords (16 MByte) address space. It also implies table alignment on 256 W (1 KB) boundary.

IV. Rdesc specifies one of 8 possible formats of the Resolution table entries.

V. Resolution Table Base [14 bits], just as the Pattern Table Base, specifies physical location of the index 0 entry 24 of the Resolution Table. It is scaled in the same way.

VI. Rsize [4 bits] is a default number of CTRL memory 14 words occupied by each entry 24. The size is $2^{Rsize}$ Words ($2^{Rsize-2}$ Bytes) but values 1, 13, 14, 15 are not used and are reserved for future use. The Rsize plays dual role in the Resolver:
   A. It is used as a scaling factor for Result Table indices stored in non-masked entries of pattern tables and non-searched short keys.
   B. It is used as an address increment during linear search of the Resolution table (see below).

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method of filtering packets having a class comprising the steps of:

compacting a table comprised of entries that include an indication to which class a given entry applies by removing redundant entries from the table;

accessing the table;

searching the entries until an entry whose class indication corresponds to a current class of the packet; and forwarding a frame associated with the entry whose class indication corresponds to the class of the packet.

2. A method as described in claim 1 including after the searching step, there is the step of reiterating the accessing and searching steps.

3. A method as described in claim 2 wherein the indication of each entry includes a bit mask, and the searching step includes the step of searching the bit mask of each entry until a set bit of a bit mask is encountered in a position corresponding to the class of the packet.

4. A method as described in claim 3 wherein the searching step includes the step of searching the bit masks linearly.

5. A method as described in claim 4 wherein each entry also includes a tag, and the forwarding step includes the step of forwarding the frame using the tag of the entry.

6. A method as described in claim 5 wherein the table has rows represented by lists of entries.

7. A method as described in claim 6 wherein the compacting step includes the step of removing any redundant entries in each row.

8. A method as described in claim 7 wherein the compacting step includes the step of removing any redundant rows in the table.

9. A data communication apparatus comprising:

a mechanism for routing or switching packets;

a memory having information for routing or switching the packets; and a mechanism for compaction of information in the memory which removes redundancies in the information.

10. An apparatus as described in claim 9 wherein the routing mechanism includes a packet filtering mechanism.

11. An apparatus as described in claim 10 wherein the memory includes resolution tables.

12. An apparatus as described in claim 11 wherein the resolution tables have rows represented by lists of entries which have the information.

13. An apparatus as described in claim 12 wherein the compaction mechanism removes any redundant entries in each row.

14. An apparatus as described in claim 13 wherein the compaction mechanism removes any redundant rows in the resolution tables.

* * * * *